(12) United States Patent
Corless et al.

(10) Patent No.: US 12,174,071 B2
(45) Date of Patent: Dec. 24, 2024

(54) SYSTEM, APPARATUS, AND METHOD FOR IMPROVED BACKGROUND CORRECTION AND CALIBRATION OF OPTICAL DEVICES

(71) Applicant: Verity Instruments, Inc., Carrollton, TX (US)

(72) Inventors: John Corless, Carrollton, TX (US); Chris Pylant, Carrollton, TX (US); Andrew Kueny, Carrollton, TX (US)

(73) Assignee: Verity Instruments, Inc., Carrollton, TX (US)

( * ) Notice: Subject to any disclaimer, the term of this patent is extended or adjusted under 35 U.S.C. 154(b) by 0 days.

(21) Appl. No.: 18/316,117

(22) Filed: May 11, 2023

(65) Prior Publication Data

US 2023/0366736 A1 Nov. 16, 2023

Related U.S. Application Data

(60) Provisional application No. 63/341,869, filed on May 13, 2022.

(51) Int. Cl.
*G01J 3/28* (2006.01)

(52) U.S. Cl.
CPC ..... *G01J 3/2803* (2013.01); *G01J 2003/2813* (2013.01)

(58) Field of Classification Search
CPC ............ G01J 3/2803; G01J 2003/2813; G01J 2003/2869; G01J 3/2823; G01J 2001/444; G01J 2003/2866; G01N 21/274; G01N 21/314; G01N 2201/127
See application file for complete search history.

(56) References Cited

U.S. PATENT DOCUMENTS

| | | | | |
|---|---|---|---|---|
| 6,419,801 B1 * | 7/2002 | Smith, Jr. | ............... | G01J 3/443 216/60 |
| 7,049,156 B2 | 5/2006 | Kueny | | |
| 2006/0192864 A1 * | 8/2006 | Mauritzson | ............ | H04N 25/75 348/E5.079 |
| 2008/0074513 A1 * | 3/2008 | Noguchi | ............... | H04N 25/71 348/E5.081 |

(Continued)

FOREIGN PATENT DOCUMENTS

| | | |
|---|---|---|
| CN | 102466520 A | 5/2012 |
| JP | H049704 A | 1/1992 |

(Continued)

*Primary Examiner* — Thanh Luu
*Assistant Examiner* — Monica T Taba

(57) ABSTRACT

The disclosure provides features for improved processing of optical data by identifying and characterizing stationary and transient signals in the electrical data representing the data collected from an optical sensor of an optical measurement system. In one example, an optical measurement system is disclosed that includes: (1) a pixel area of an optical sensor having multiple pixels that store an electrical charge corresponding to a received optical signal, (2) one or more reduced illumination regions that provide signal levels intrinsic to the optical sensor, and (3) one or more processors configured to adjust, during active operation of the system, digital representations of the electrical charges from the pixels of the pixel area using characterizations of the signal levels from the one or more reduced illumination regions.

25 Claims, 8 Drawing Sheets

(56) References Cited

U.S. PATENT DOCUMENTS

| | | | | |
|---|---|---|---|---|
| 2015/0363000 A1* | 12/2015 | Yang | ........................ | G06F 3/017 |
| | | | | 345/156 |
| 2018/0224334 A1* | 8/2018 | O'Rourke | ............ | G01N 21/274 |
| 2019/0253647 A1* | 8/2019 | Park | .................. | H01L 27/14689 |
| 2021/0033589 A1* | 2/2021 | Tufillaro | ............... | G01J 3/0289 |

FOREIGN PATENT DOCUMENTS

| JP | 2004522168 A | 7/2004 |
|---|---|---|
| JP | 2008022486 A | 1/2008 |
| JP | 2008509399 A | 3/2008 |
| JP | 2019530322 A | 10/2019 |
| JP | 2021139907 A | 9/2021 |

\* cited by examiner

SYSTEM, APPARATUS, AND METHOD FOR IMPROVED BACKGROUND CORRECTION AND CALIBRATION OF OPTICAL DEVICES

CROSS-REFERENCE TO RELATED APPLICATION

This application claims the benefit of U.S. Provisional Application Ser. No. 63/341,869, filed by John Corless, et al., on May 13, 2022, entitled "SYSTEM, APPARATUS, AND METHOD FOR IMPROVED BACKGROUND CORRECTION AND CALIBRATION FOR SPECTROMETERS", which is commonly assigned with this application and incorporated herein by reference in its entirety.

TECHNICAL FIELD

This disclosure relates, generally, to optical spectroscopy systems and methods of use, and more specifically, to improved background correction and calibration of data recorded from imaging and non-imaging spectrometers used during semiconductor processing.

BACKGROUND

Optical monitoring of semiconductor processes is a well-established method for controlling processes such as etch, deposition, chemical mechanical polishing and implantation. Optical emission spectroscopy (OES) and interferometric endpoint (IEP) are two basic types of modes of operation for data collection. In OES applications light emitted from the process, typically from plasmas, is collected and analyzed to identify and track changes in atomic and molecular species which are indicative of the state or progression of the process being monitored. In IEP applications, light is typically supplied from an external source, such as a flashlamp, and directed onto a workpiece. Upon reflection from the workpiece, the sourced light carries information, in the form of the reflectance of the workpiece, which is indicative of the state of the workpiece. Extraction and modeling of the reflectance of the workpiece permits understanding of film thickness and feature sizes/depth/widths among other properties.

SUMMARY

In one aspect, the disclosure provides an optical measurement system. In one example, the optical measurement system includes: (1) a pixel area of an optical sensor having multiple pixels that store an electrical charge corresponding to a received optical signal, (2) one or more reduced illumination regions that provide signal levels intrinsic to the optical sensor, and (3) one or more processors configured to adjust, during active operation of the system, digital representations of the electrical charges from the pixels of the pixel area using characterizations of the signal levels from the one or more reduced illumination regions.

The disclosure also provides a method of processing optical data. In one example the method includes: (1) defining a dark level estimate value for an optical sensor that receives the optical data, (2) collecting active pixel values from active pixels of the optical sensor, (3) generating dark subtracted pixel values from the active pixel values and the dark level estimate values, and (4) generating corrected active pixel values by modifying the active pixel values based on the dark subtracted pixel values.

In yet another aspect, the disclosure provides a computer program product having a series of operating instructions stored on a non-transitory computer readable medium that directs one or more processors, when initiated thereby, to perform operations for adjusting digital representations of electrical charges from pixels of a pixel area of an optical sensor. In one example the operations include: (1) characterizing signal levels from pixels of the optical sensor, wherein the pixels include pixels from one or more reduced illumination regions of the optical sensor and (2) adjusting digital representations of the electrical charges using the characterizations.

BRIEF DESCRIPTION

Reference is now made to the following descriptions taken in conjunction with the accompanying drawings, in which.

DETAILED DESCRIPTION

Figure 1:
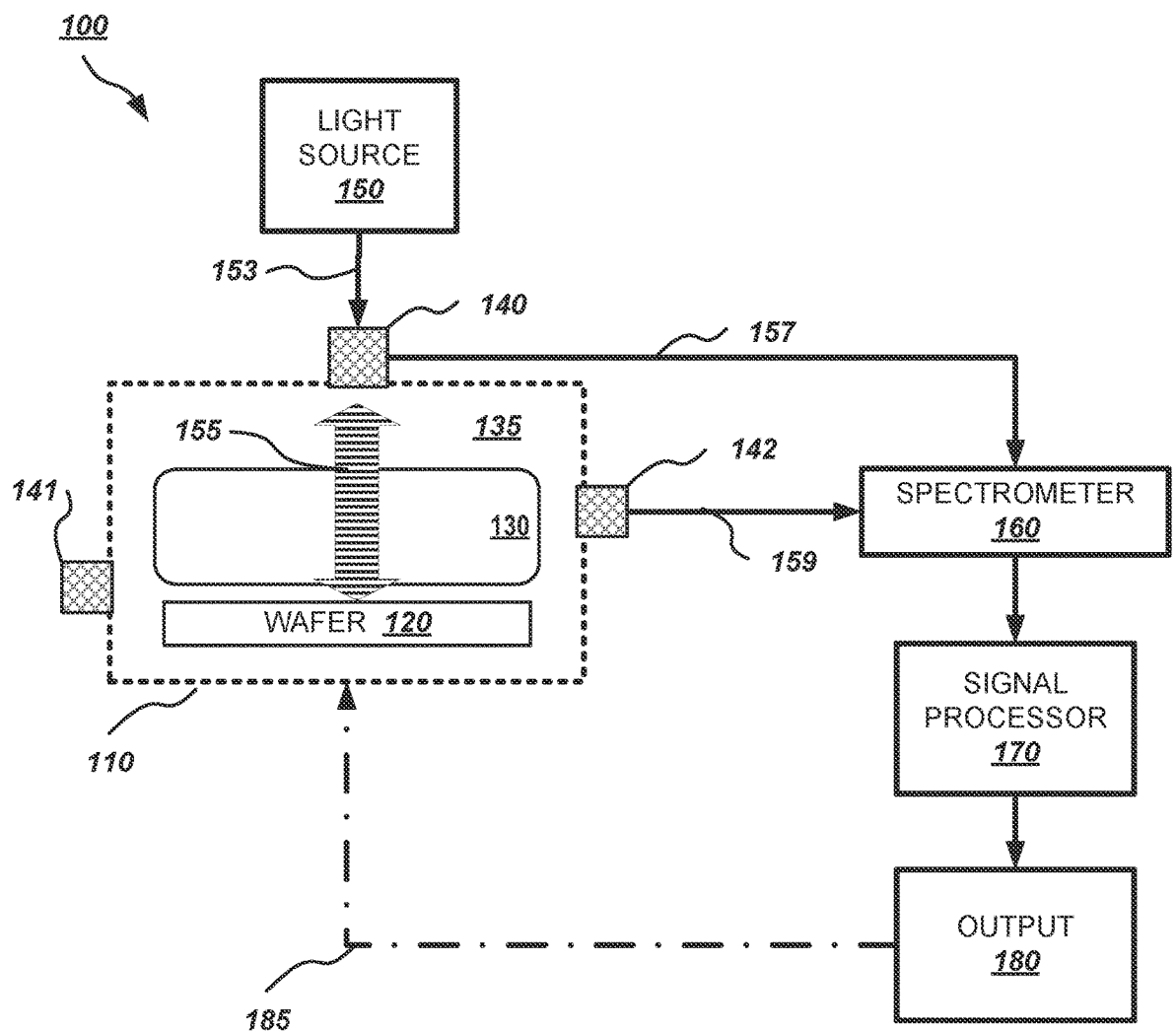
FIG. 1 is a block diagram of a system for employing OES and/or IEP to monitor and/or control the state of a plasma or non-plasma process within a semiconductor process tool.

In the following description, reference is made to the accompanying drawings that form a part hereof, and in which is shown by way of illustration, specific embodiments in which the invention may be practiced. These embodiments are described in sufficient detail to enable those skilled in the art to practice the invention, and it is to be understood that other embodiments may be utilized. It is also to be understood that structural, procedural and system changes may be made without departing from the spirit and scope of the present invention. The following description is, therefore, not to be taken in a limiting sense. For clarity of exposition, like features shown in the accompanying drawings are indicated with like reference numerals and similar features as shown in alternate embodiments in the drawings are indicated with similar reference numerals. Other features of the present invention will be apparent from the accompanying drawings and from the following detailed description. It is noted that, for purposes of illustrative clarity, certain elements in the drawings may not be drawn to scale.

The constant advance of semiconductor processes toward faster processes, smaller feature sizes and more complex structures places great demands on process monitoring technologies. For example, higher data rates are required to accurately monitor much faster etch rates on very thin layers where changes in Angstroms (a few atomic layers) are critical such as for field-effect transistor (FinFET) and 3D NAND structures. Wider optical bandwidth and greater signal-to-noise are required in many cases both for OES and IEP methodologies to aid in detecting small changes for reflectances, optical emissions, or both. Cost and packaging sizes are also under constant pressure as the process equipment becomes more complex and costly itself. All of these requirements seek to advance the performance of optical monitoring of semiconductor processes. Regardless if for OES or IEP methodologies, important components of many optical monitoring systems are measurement devices or systems, such as spectrometers, and their ability to consistently and accurately convert received optical data to electrical data for control and monitoring of semiconductor processes.

Accordingly, disclosed herein are processes, systems, and apparatuses that provide improved processing of optical data by identifying and characterizing stationary and transient signals in the electrical data representing the data collected from an optical sensor within an optical measurement system. Electrical data collected from an optical sensor may generally include optical data from the conversion of incident light and non-optical data generated internally to a sensor or other system components that does not arise from the incident light. Since non-optical data is non-indicative of the process being monitored, it is desirable that this specific data should be as stable as possible and minimized to avoid improper characterization of monitored processes. The improved processing can also include modifying the electrical signals, or the data associated with the electrical signals, in either the analog or digital signal domain to provide a truer representation of the optical data and isolation of different types of variations of signal levels associated with, for example, the non-optical data. The improved processing can be used to more accurately monitor semiconductor processes.

With specific regard to monitoring and evaluating the state of a semiconductor process within a process tool, FIG. 1 illustrates a block diagram of process system 100 utilizing OES and/or IEP to monitor and/or control the state of a plasma or non-plasma process within a semiconductor process tool 110. Semiconductor process tool 110, or simply process tool 110, generally encloses wafer 120 and possibly process plasma 130 in a typically, partially evacuated volume of a chamber 135 that may include various process gases. Process tool 110 may include one or multiple optical interfaces, or simply interfaces, 140, 141 and 142 to permit observation into the chamber 135 at various locations and orientations. Interfaces 140, 141 and 142 may include multiple types of optical elements such as, but not limited to, optical filters, lenses, windows, apertures, fiber optics, etc.

For IEP applications, light source 150 may be connected with interface 140 directly or via fiber optical cable assembly 153. As shown in this configuration, interface 140 is oriented normal to the surface of wafer 120 and often centered with respect to the same. Light from light source 150 may enter the internal volume of chamber 135 in the form of collimated beam 155. Beam 155 upon reflection from the wafer 120 may again be received by interface 140. In common applications, interface 140 may be an optical collimator. Following receipt by interface 140, the light may be transferred via fiber optic cable assembly 157 to an optical measurement system 160 for detection and conversion to digital signals. The optical measurement system 160 can include or can be a spectrometer. As indicated in FIG. 1, a spectrometer will be used herein as an example of an optical measurement system that can be used to convert light to electrical signals. Other examples of an optical measurement system include a fixed or scanning monochromator and single or multiple diode detectors with or without wavelength filtering. The light can include sourced and detected light and may include, for example, the wavelength range from deep ultraviolet (DUV) to near-infrared (NIR). Wavelengths of interest may be selected from any subrange of the wavelength range. For larger substrates or where understanding of wafer non-uniformity is a concern, additional optical interfaces (not shown in FIG. 1) normally oriented with the wafer 120 may be used. The processing tool 110 can also include additional optical interfaces positioned at different locations for other monitoring options.

For OES applications, interface 142 may be oriented to collect light emissions from plasma 130. Interface 142 may simply be a viewport or may additionally include other optics such as lenses, mirrors and optical wavelength filters. Fiber optic cable assembly 159 may direct any collected light to spectrometer 160 for detection and conversion to digital signals. The spectrometer 160 can include a CCD sensor and convertor, such as CCD sensor 200 and convertor 250 of FIG. 2, for the detection and conversion. Multiple interfaces may be used separately or in parallel to collect OES related optical signals. For example, interface 141 may be located to collect emissions from near the surface of wafer 120 while interface 142 may be located to view the bulk of the plasma 130, as shown in FIG. 1.

In many semiconductor processing applications, it is common to collect both OES and IEP optical signals and this collection provides multiple problems for using spectrometer 160. Typically OES signals are continuous in time whereas IEP signals may be either/both continuous or discrete in time. The mixing of these signals causes numerous difficulties as process control often requires the detection of small changes in both the OES and IEP signals and the inherent variation in either signal can mask the observation of the changes in the other signal. It is not advantageous to support multiple spectrometers for each signal type due to, for example, cost, complexity, inconvenience of signal timing synchronization, calibration and packaging.

After detection and conversion of the received optical signals to analog electrical signals by the spectrometer 160, the analog electrical signals are typically amplified and digitized within a subsystem of spectrometer 160, and passed to signal processor 170. Signal processor 170 may be, for example, an industrial PC, PLC or other system, which employs one or more algorithms to produce output 180 such as, for example, an analog or digital control value representing the intensity of a specific wavelength or the ratio of two wavelength bands. Instead of a separate device, signal processor 170 may alternatively be integrated with spectrometer 160. The signal processor 170 may employ an OES algorithm that analyzes emission intensity signals at predetermined wavelength(s) and determines trend parameters that relate to the state of the process and can be used to access that state, for instance end point detection, etch depth, etc. For IEP applications, the signal processor 170 may employ an algorithm that analyzes wide-bandwidth portions of spectra to determine a film thickness. For example, see System and Method for In-situ Monitor and Control of Film Thickness and Trench Depth, U.S. Pat. No. 7,049,156, incorporated herein by reference. Output 180 may be transferred to process tool 110 via communication link 185 for monitoring and/or modifying the production process occurring within chamber 135 of the process tool 110.

The illustrated and described components of FIG. 1 are simplified for expedience and are commonly known. In addition to common functions, the spectrometer 160 or the signal processor 170 can also be configured to identify stationary and transient variations of optical and non-optical signals and process these signals according to the methods and/or features disclosed herein. As such, the spectrometer 160 or the signal processor 170 can include algorithms, processing capability, and/or logic to identify and process stationary and transient optical and non-optical signals. The algorithms, processing capability, and/or logic can be in the form of hardware, software, firmware, or any combination thereof. The algorithms, processing capability, and/or logic can be within one computing device or can also be distributed over multiple devices, such as the spectrometer 160 and the signal processor 170. Accordingly, one or more processors can be configured to perform the identifying and processing. The processing can include adjusting digital representations of electrical charges from pixels of a pixel area of an optical sensor using characterizations of signal levels from one or more reduced illumination regions of the optical sensor. The optical sensor can be part of the spectrometer 160. The optical sensor can be a charge-coupled device (CCD) sensor such as represented in FIG. 2.

Figure 2:
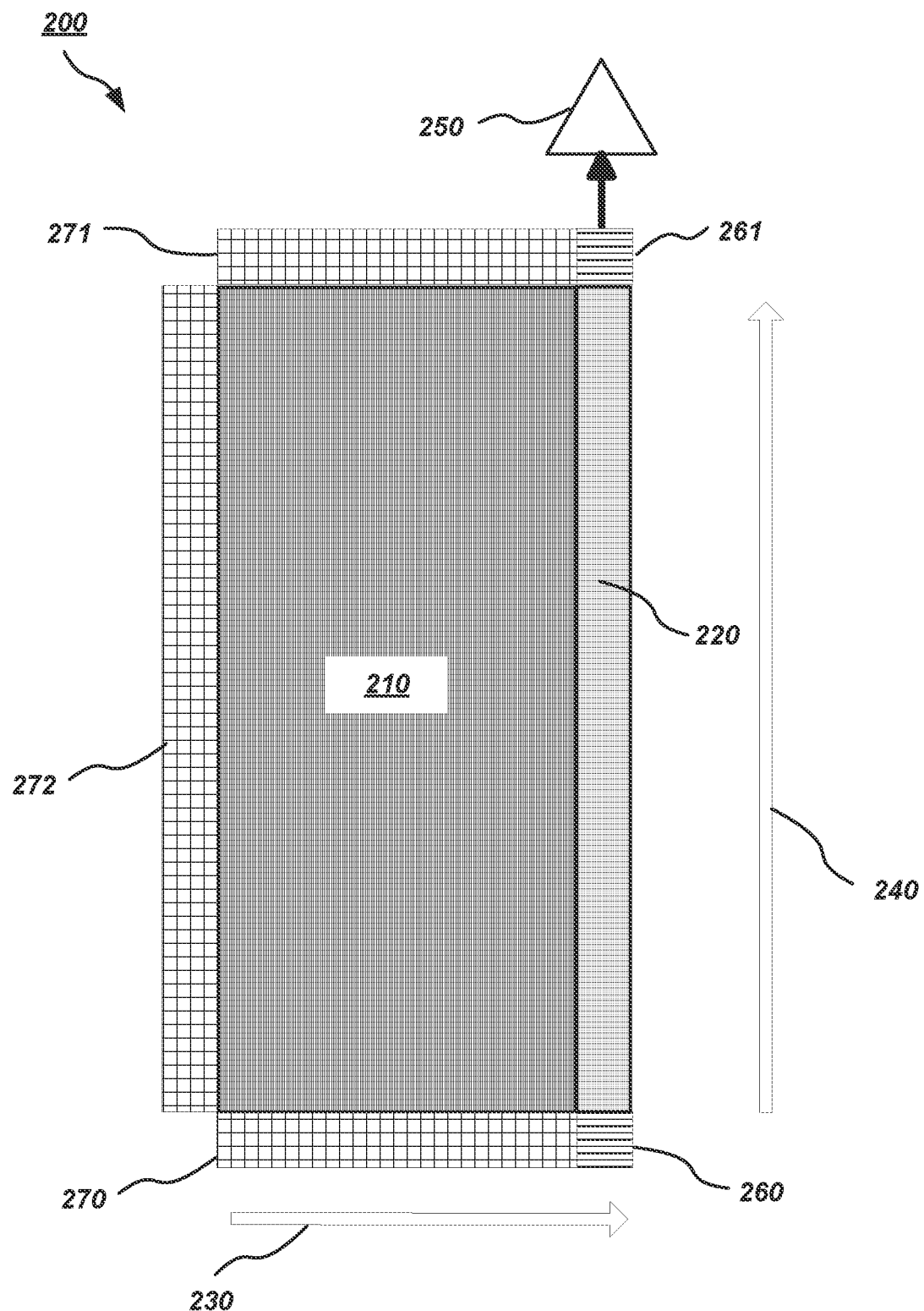
FIG. 2 is a schematic diagram which generally depicts the functional elements of a typical areal CCD sensor.

FIG. 2 is a schematic diagram which generally depicts the functional elements of conventional areal CCD sensor 200. Sensor 200 generally includes active pixel area 210 which may be divided into an array of individual pixels such as 1024(H)×122(V) as in the S7031 CCD sensor from Hamamatsu of Japan. Sensor 200 can be integrated with a spectrometer, such as spectrometer 160 of FIG. 1 or used with another type of optical measurement system. As a matter of definition and clarity, it should be noted that herein the use of "horizontal" and "vertical" when addressing optical sensors respectively refer to the long and short physical axes of the optical sensor under discussion. In spectroscopy applications it is common that the long/horizontal axis of the optical sensor is aligned with the orientation of the wavelength dispersion while the short/vertical axis is associated with the imaging or collection of a defined optical source or illuminated aperture, such as a fiber or optical slit.

Sensor 200 also includes a horizontal shift register 220 proximate to pixel area 210. Optical signals integrated upon sensor 200, such as from fiber optic cable assembly 157 or 159, are typically read via shifting the stored charge in each pixel of pixel area 210 vertically as indicated by arrow 230 into horizontal shift register 220. All or portions of active pixel area 210 may be so shifted in a row-by-row fashion. Subsequent to vertical shifting, horizontal shifts may be performed as indicated by arrow 240. As each pixel of horizontal shift register 220 is shifted (toward the top in FIG. 2) its signal content may be converted from an analog to a digital signal basis by convertor 250, e.g., analog electrical signals to digital electrical signals. Subsequent handling and processing of the resultant digital data can occur internally or externally to a spectrometer, such as in signal processor 170, and can include averaging, curve fitting, threshold detections, filtering, and other mathematical manipulations such as described herein.

Sensor 200 may further include one or more reduced illumination regions of non-illuminated or partially illuminated elements, such as shift register elements 260 and 261 and pixel area elements 270, 271, and 272. Commonly elements 260 and 261 may be referred to as "blank" pixels and elements 270, 271, and 272 may be referred to as "bevel" pixels. One or more of these regions or elements, may be included within sensor 200 and provide signal levels intrinsic to sensor 200. The signal levels can be non-optical signal levels. Non-optical signals can include, in general, signal offsets, signal transients, and other forms of signal variation driven by temperature or other non-optical factors.

Figure 3A:
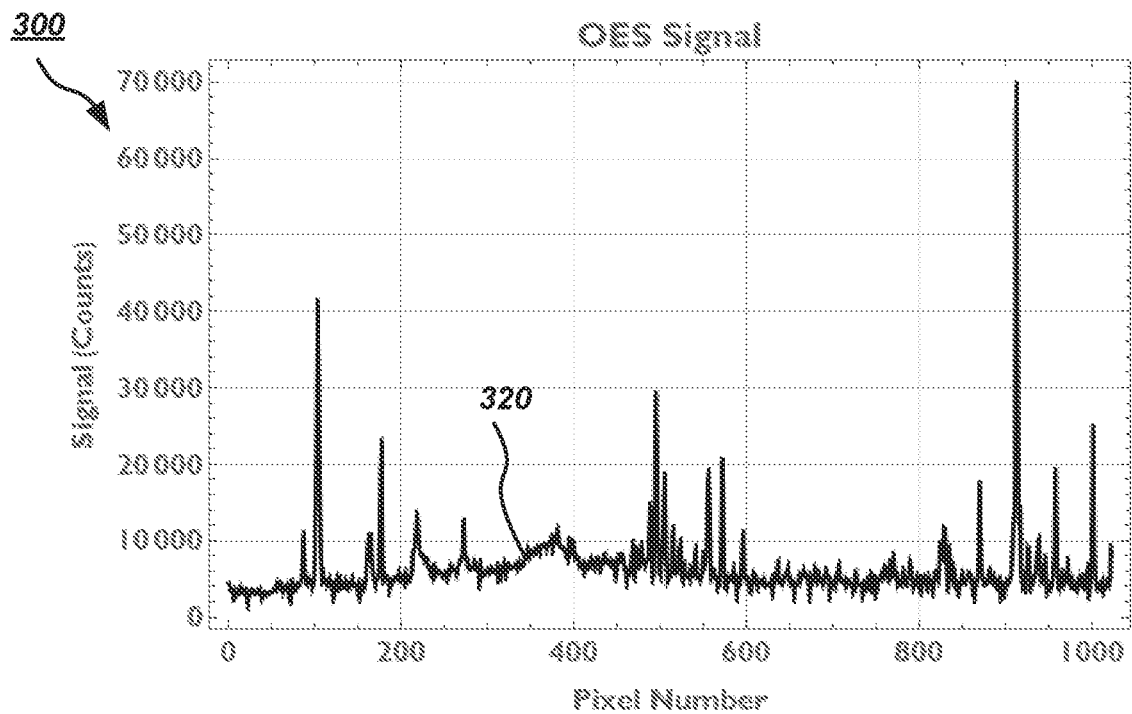
FIG. 3A is a plot of a typical OES optical signal (spectrum) resulting from the conversion of collected light, in accordance with the principles of this disclosure.
Figure 3B:
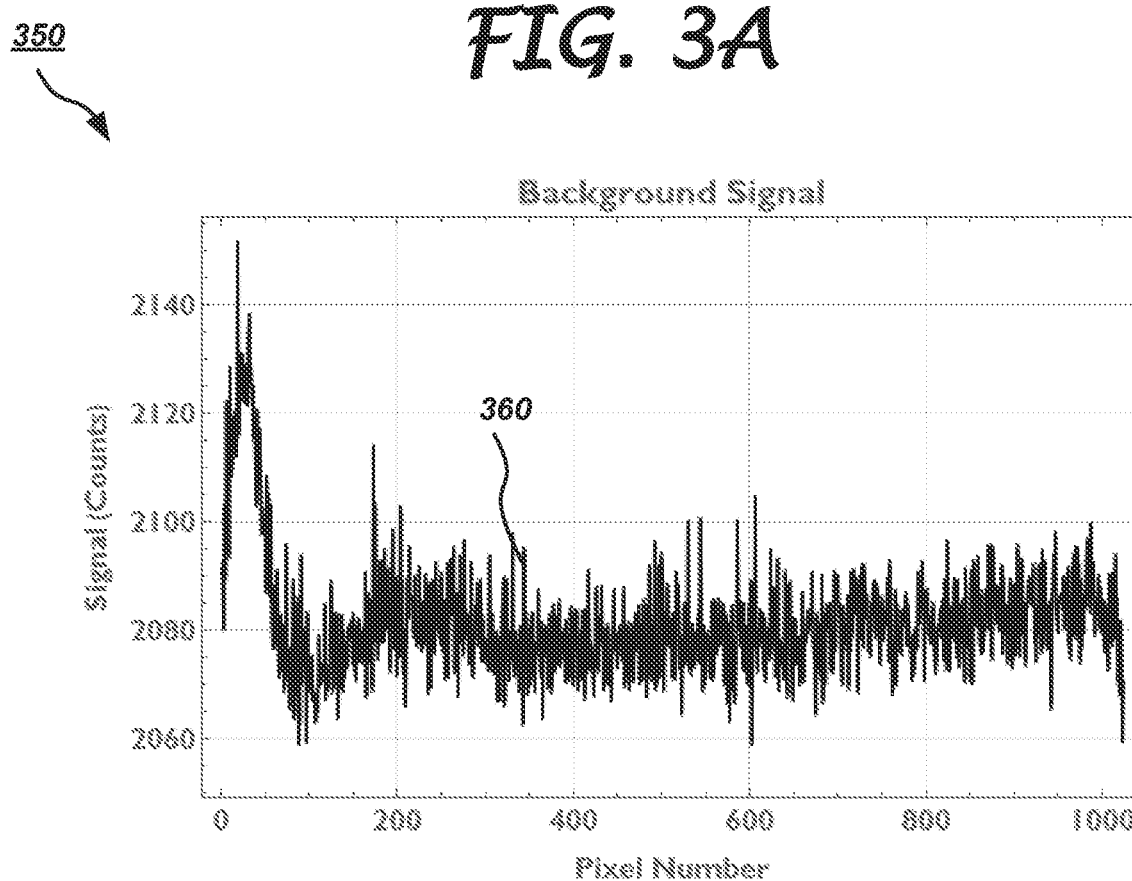
FIG. 3B is a plot of an example of a background signal resulting from the occurrence of non-optical signal sources, in accordance with the principles of this disclosure.

FIGS. 3A and 3B provide context of optical and non-optical signal data and the method described herein for processing of optical and non-optical signals. Each of FIGS. 3A and 3B illustrates a plot of a signal collected from a spectrometer. Each plot has an x axis in physical pixel units (typically non-uniformly spaced wavelength units) and a y axis of signal count units. FIG. 3A illustrates a plot 300 of a typical OES optical signal (spectrum) 320 derived from incident light upon a sensor of the spectrometer. Spectrum 320 shows features typical of both molecular (e.g., broadband structure near 400 nm) and atomic emissions (e.g., narrow peaks throughout). FIG. 3B illustrates a plot 350 of a background signal 360 derived from non-optical signals collected from the same sensor. As may be readily observed by comparison of FIGS. 3A and 3B, background signal 360 can provide significant modification to spectrum 320 if not removed. For example, the average level of background signal 360 is approximately 2080 counts whereas the average signal level of spectrum 320 is approximately 5000 counts. Additionally, background signal 360 includes features occurring between pixels 1 and 100 that could be interpreted as a spectral feature. Static values and temporal evolution of the average value of the background signal (or spectrum) 360 and any features therein may lead to misinterpretation of features or changes in an associated spectrum, such as optical signal 320, leading to semiconductor process control error. For state-of-the-art semiconductor processes, control detection thresholds may be near or below a few percent and may be readily obscured by changes in non-optical background signals.

Figure 4:
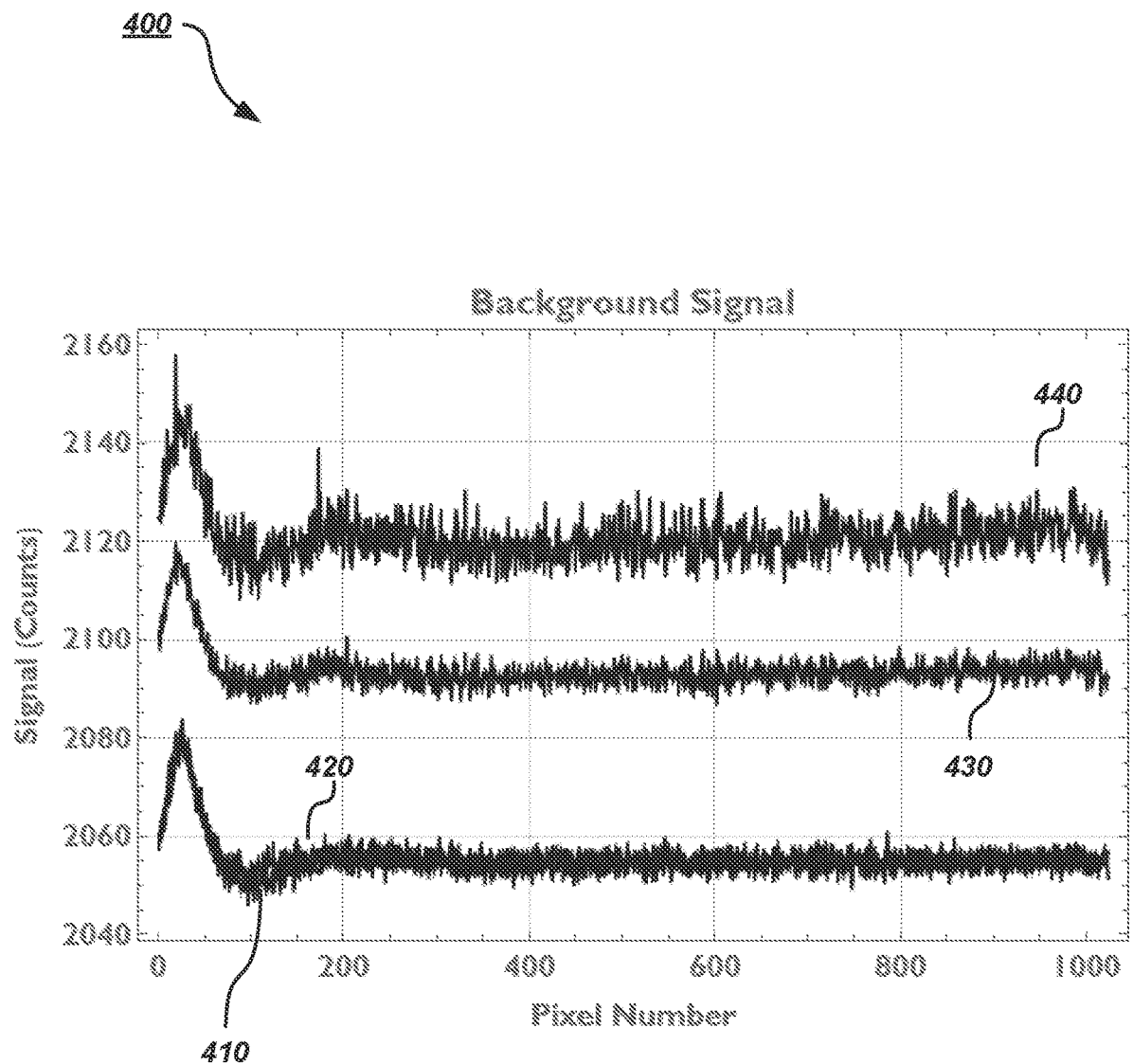
FIG. 4 is a plot indicating how a background signal may be influenced by operating temperature and sampling frequency, in accordance with the principles of this disclosure.

FIG. 4 illustrates plot 400 indicating how a background signal derived from non-optical signals may be influenced by operating temperature and sampling frequency of a sensor, such as sensor 200. Plot 400 has an x axis in physical pixel units (typically non-uniformly spaced wavelength units) and a y axis of signal count units. Signals 410 and 420 were collected with a sensor operating at a 2 ms sampling period or equivalently at a sample rate of 500 spectra per second and at ambient temperatures of 0 and 40 Celsius respectively. Signals 410 and 420 are essentially indistinguishable and are characterized by nearly the same average signal level as well as nearly the same variation over pixel number.

Signals 430 and 440 were collected from the same sensor as signals 410 and 420 but operating at a 100 ms sampling period or equivalently at a sample rate of 10 spectra per second and at ambient temperatures of 0 and 40 Celsius respectively. Signals 430 and 440 are readily distinguishable and are characterized by an average signal level change of approximately 30 counts as well as multiple differences in variation over pixel number as well as a varied RMS noise level. This suggests that it is better to operate the sensor at the 2 ms sampling period but this is not practical as the sampling period is contingent upon factors such as the amount of incident light. For relatively very high incident light levels a 2 ms sampling period may be suitable but for considerably lower incident light levels longer sampling periods are required to obtain suitable signal levels and signal-to-noise ratios.

Figure 5A:
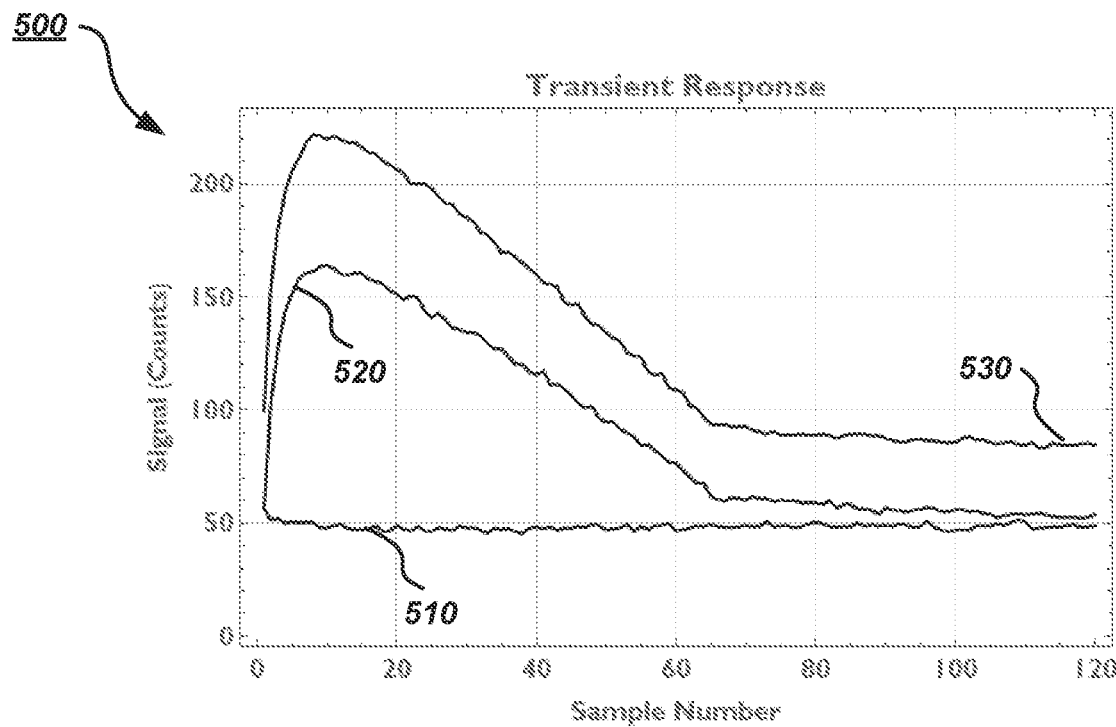
FIGS. 5A and 5B are a set of plots detailing transient effects upon background signals as influenced by sampling frequency and thermal changes, in accordance with the principles of this disclosure.
Figure 5B:
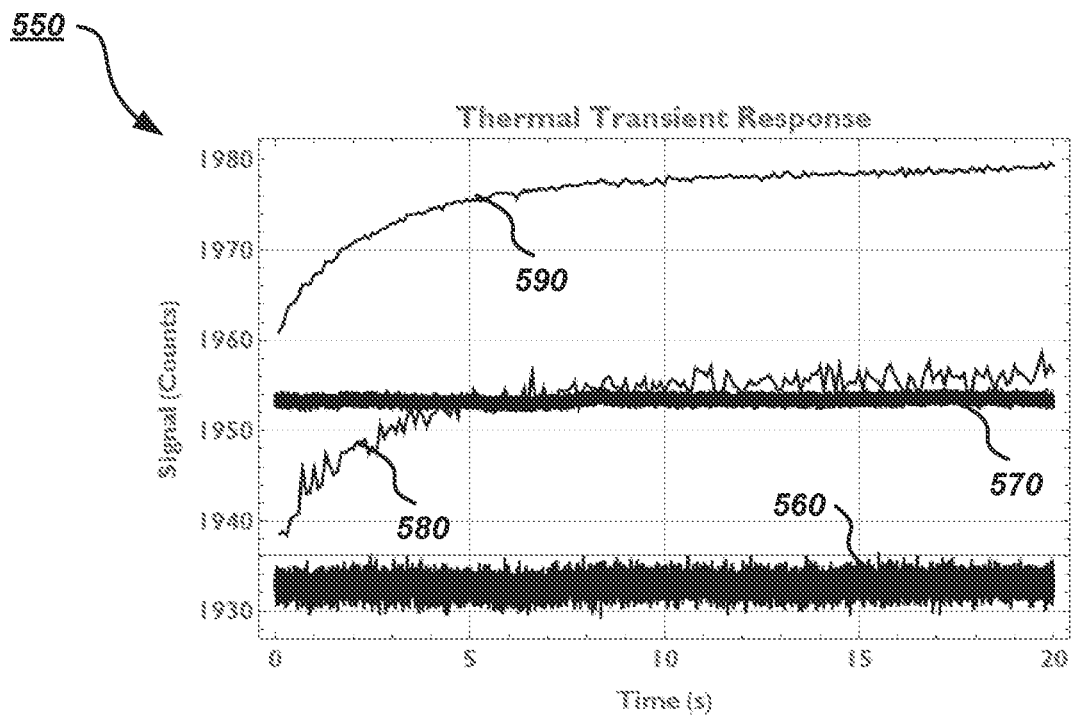

FIGS. 5A and 5B are a set of plots 500 and 550 that further detail transient effects upon background signals as influenced by sampling frequency and thermal changes. Plot 500 has an x axis in sample number (which can be associated with a time increment per sample) and a y axis of signal count units. Plot 500 illustrates background signal variation driven by changes in sampling rate between a predetermined and fixed idle time sampling period of 2 ms and a sampling period used during an actual process signal collection period. Signal 510 has a process sampling period of 2 ms and therefore does not indicate transient behavior as the idle time rate and the actual rate are equivalent. Signal 520 has a process sampling period of 10 ms and indicates transient behavior as the idle time rate and the actual rate are different. For signal 530 the sample period is increased to 100 ms and a greater increase in the transient behavior is observed. Transients such as those shown in plot 500 may be deleterious to process control due to common practice of utilizing the earliest portions (samples) of collected data as reference values for further along during processing. The variability of the transients may adversely influence processing parameters such as baselines and thresholds. Variations between the active state (where ongoing signal collection and processing occur for process control) and the idle state (where signal collection and processing may be altered or paused while waiting for the initiation of collection for process control) can be due to a different read frequency that changes the current to the sensor, which changes the thermal environment and causes offsets to shift in various components.

Plot 550 illustrates thermally driven transients and their dependencies upon sampling period. Plot 550 has an x axis in time units and a y axis of signal count units. Signals 560 and 570 are, respectively, temporal trends of average values of blank pixels and active pixels from an optical sensor operating at a 2 ms sampling period. For this operating condition essentially no transient is observed but an offset is readily observable. Signals 580 and 590 are, respectively, temporal trends of average values of blank pixels and active pixels from an optical sensor operating at a 100 ms sampling period. For this operating condition a transient of approximately 10 seconds is observed along with an offset in the signal level. Transients and offsets such as those shown in plot 550 may derive from changes in power usage by an optical sensor and an associated thermoelectric cooler and subsequent rethermalization of the sensor to the ambient environment. These types of deviations may be deleterious to process control due to common practice of utilizing the earliest portions (samples) of collected data as reference values for further along during processing. The variability of the transients may adversely influence processing parameters such as baselines and thresholds.

Figure 6:
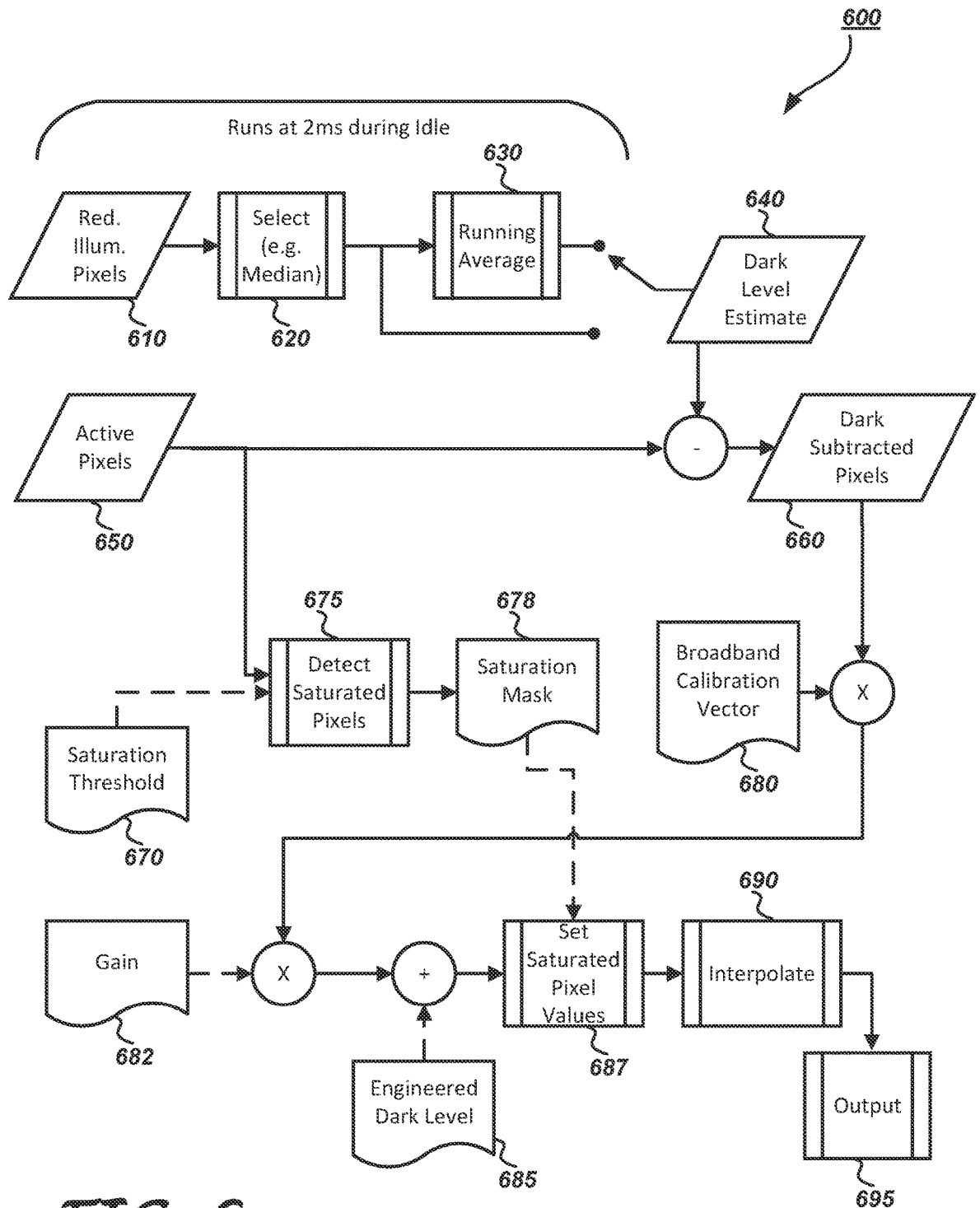
FIG. 6 is a flow chart for an example method of reading spectral data from a CCD device and processing the spectral data by applying background correction and calibration to those signals, in accordance with the principles of this disclosure.

FIG. 6 is a flow chart for an example of a method 600 of reading spectral data from an optical sensor and processing the spectral data by applying background correction and calibration to those signals to address the transients, offsets and other signal variations discussed herein. For example, processing the spectral data to accommodate for offsets/shape as represented in FIG. 4 and transients as represented in FIGS. 5A and 5B. The method 600 characterizes the signal levels and variations from at least some reduced illumination regions and uses the characterizations to adjust the digital representations of the spectral data from active pixels of the optical sensor. The method 600 can be performed by one or more processors and can be performed in real-time during active operation of the optical sensor or optical measurement system that includes the optical sensor. For example, the method 600 can be performed by the spectrometer 160, the signal processor 170, or a combination thereof. Method 600 initiates with initialization steps 610, 620, and 630 which may be repeatedly executed at a 2 ms rate during idle times and at other rates during active collection times, which is also referred to as active operation as noted above. Idle times being those periods during which the spectrometer is not actively collecting optical data used for process control and/or process monitoring. During step 610 values from pixels of regions (reduced illumination pixels) may be collected from the sensor. As discussed in association with FIG. 2 above, various sensors may include multiple reduced illumination pixels, such as blank pixels and/or bevel pixels. If the reduced illumination pixels are only associated with shift register elements, typically 4-20 reduced illumination pixels may exist and be read. After collection and during step 620 a median value or other mathematical value (e.g., average value or other more complex mathematically derived value) may be selected from the reduced illumination pixel values. As the cycle count during idle time increases a running average of the value selected during step 620 may be calculated during step 630.

Once an active collection state of the spectrometer has been entered a dark level estimate may be defined during step 640. The dark level estimate is determined from reduced illumination pixels, also referred to as dark pixels, of the sensor and may also include data from active regions of the sensor. A dark level estimate may be subject to similarities or differences between the configuration of the active state and the idle state. For example, the sample period, temperature or other properties may be different between the states. In a specific example where the configuration of the idle state and the active state are the same, the dark level estimate may be equated to the running average determined during step 630. Where differences occur between the idle and active states, the value selected during step 620 may be equated to the dark level estimate during step 640, where it is possible to bypass the running average and select the current value from the active state operation. In FIG. 6, the option of using the running average of step 630 is represented by the position of the arrow indicating a process step switch. Using the mathematical representation from step 620, the running average from step 630, or even another representation or calculation, can be predetermined and implemented or can be determined by a processor in real-time. Factors for considering which option to use can be thermal characteristics, sampling rates, other properties of the active and idle states, or a combination thereof. Other values for dark level estimates may be generated by mathematical manipulation of blank pixel values other than the specific examples described herein above. The dark level estimate can correspond to a dark spectrum of a spectrometer, which is a spectrum taken without light hitting the optical sensor.

During active collection in step 650, active pixel values may be collected. Subsequent to collection, active pixel values may be mathematically combined with a dark level estimate value from step 640 to provide dark subtracted pixels in step 660. The mathematical combination of the active pixel values and the dark level estimate may be a simple combination as in a subtraction of the dark level estimate from the active pixel values or may include additional manipulation.

Active pixel values from step 650 may also be processed along with a predetermined saturation threshold, determined during step 670, to provide detection of saturated pixel values within the set of active pixel values (typically an array of 1024 or 2048 values) during step 675. A saturation threshold may be a pixel value defined such that active pixel values at or above this value may be subject to saturation, nonlinear performance or other undesirable variation. Detection of saturated pixels, during step 675, leads to a saturation mask being defined in step 678. A saturation mask may be represented by a binary array indicating for each array index a true or false value corresponding to if the active pixel value is saturated or not.

A broadband calibration vector may be predetermined in step 680. Sensor to sensor (or spectrometer to spectrometer) consistency is important; therefore process monitoring should be same. But each processing machine includes different components and therefore different sensitivity. Therefore, the broadband calibration vector of 680 only needs to be applied to the actual light signal. Accordingly, prior to broadband calibration, such as by application of the broadband calibration vector, the dark level estimate values from step 640 are subtracted from the active pixels values of step 650 to obtain the dark subtracted pixel values of step 660. The broadband calibration vector or values thereof may be combined with the dark subtracted pixel values from step 660 to provide intensity corrected values for each pixel.

The intensity corrected values may be further adjusted by the application of a uniform gain value predetermined during step 682. Gain factor is typically a scalar value, e.g., 1.5, that is applied to all data to provide a consistent response to the same amount of incident light at the input of the optical sensor. The gain assists in compensating for the inconsistent response of the optical sensor and other spectrometer components. Subsequent to gain adjustment a predetermined engineered dark level value may be added to all pixel values to provide an appropriate offset of the pixel values with respect to a zero value during step 685. The predetermined engineered dark level value may be based on the dark level estimate of step 640. After the signal level modifications have been applied to modify or correct the active pixel values, the previous determined saturation mask may be applied during step 687 to the corrected active pixel values to generate adjusted active pixel values. Application of the saturation mask appropriately recasts a saturated signal, such as any saturated signal, that would have been adjusted by any of the previous steps of the method 600. Following application of the saturation mask, pixel data may be interpolated into a uniform wavelength-space representation of the adjusted active pixel values during step 690. The uniform wavelength-space representation of the adjusted active pixel values is then output for further use during step 695. For example, the adjusted active pixel values can be provide to the signal processor 170 and used to monitor or modify a production process.

Process 600 may be used advantageously for a multiple set of features, such as, but not limited to, 1) providing integration of a method for broadband radiometric correction that is independent of baseline offset, 2) providing background correction that reduces temperature sensitivity (blank pixels follow active pixel with temperature drift), and 3) providing background correction that does not add noise to the background level and that avoids a baseline level transient due to self-heating and cooling within the CCD.

Process 600 may be particularly useful for low dark current systems (i.e., thermoelectric (TE) cooled devices where dark currents are low generally and short integration times are commonly used so dark currents may have limited influence) where ambient temperature variations are one of the main causes of baseline offset and transient changes.

Figure 7:
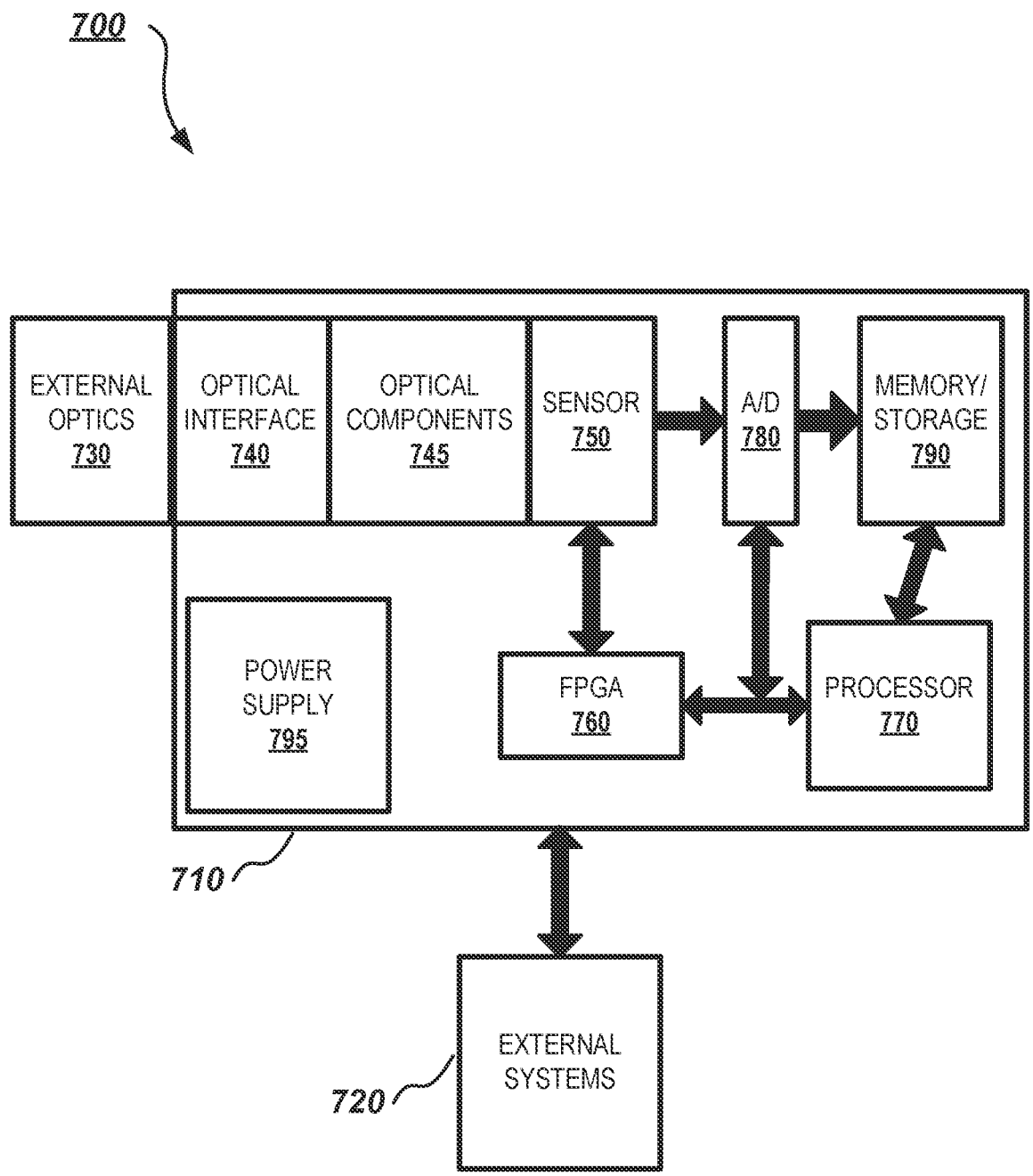
FIG. 7 is a block diagram of a spectrometer and specific related systems, in accordance with the principles of this disclosure.

FIG. 7 is a block diagram of an optical system 700 including a spectrometer 710 and specific related systems, in accordance with one embodiment of this disclosure. Spectrometer 710 may incorporate the system, features, and methods disclosed herein to the advantage of measurement of optical signals from semiconductor processes and may be associated with spectrometer 160 of FIG. 1. Spectrometer 710 may receive optical signals from external optics 730, such as via fiber optic cable assemblies 157 or 159, and may, following integration and conversion, send data to external systems 720, such as output 180 of FIG. 1, which may also be used to control spectrometer 710 by, for example, selecting a mode of operation or controlling integration timing as defined herein. Spectrometer 710 may include optical interface 740 such as a subminiature assembly (SMA) or ferrule connector (FC) fiber optic connector or other opto-mechanical interface. Further optical components 745 such as slits, lenses, filters and gratings may act to form, guide and chromatically separate the received optical signals and direct them to sensor 750 for integration and conversion. Sensor 750 may be associated with sensor 200 of FIG. 2. Low-level functions of sensor 750 may be controlled by elements such as FPGA 760 and processor 770. Following optical to electrical conversion, analog signals may be directed to A/D convertor 780 and converted from electrical analog signals to electrical digital signals which may then be stored in memory 790 for immediate or later use and transmission, such as to external systems 720 (cf., signal processor 170 of FIG. 1). Although certain interfaces and relationships are indicated by arrows, not all interactions and control relations are indicated in FIG. 7. Spectral data shown in FIGS. 3-5B may be, for example, collected, stored and/or acted upon, according to process 600 of FIG. 6 and within/by one or multiple of memory/storage 790, FPGA 760, processor 770 and/or external systems 720. Spectrometer 710 also includes a power supply 795, which can be a conventional AC or DC power supply typically included with spectrometers.

Figure 8:
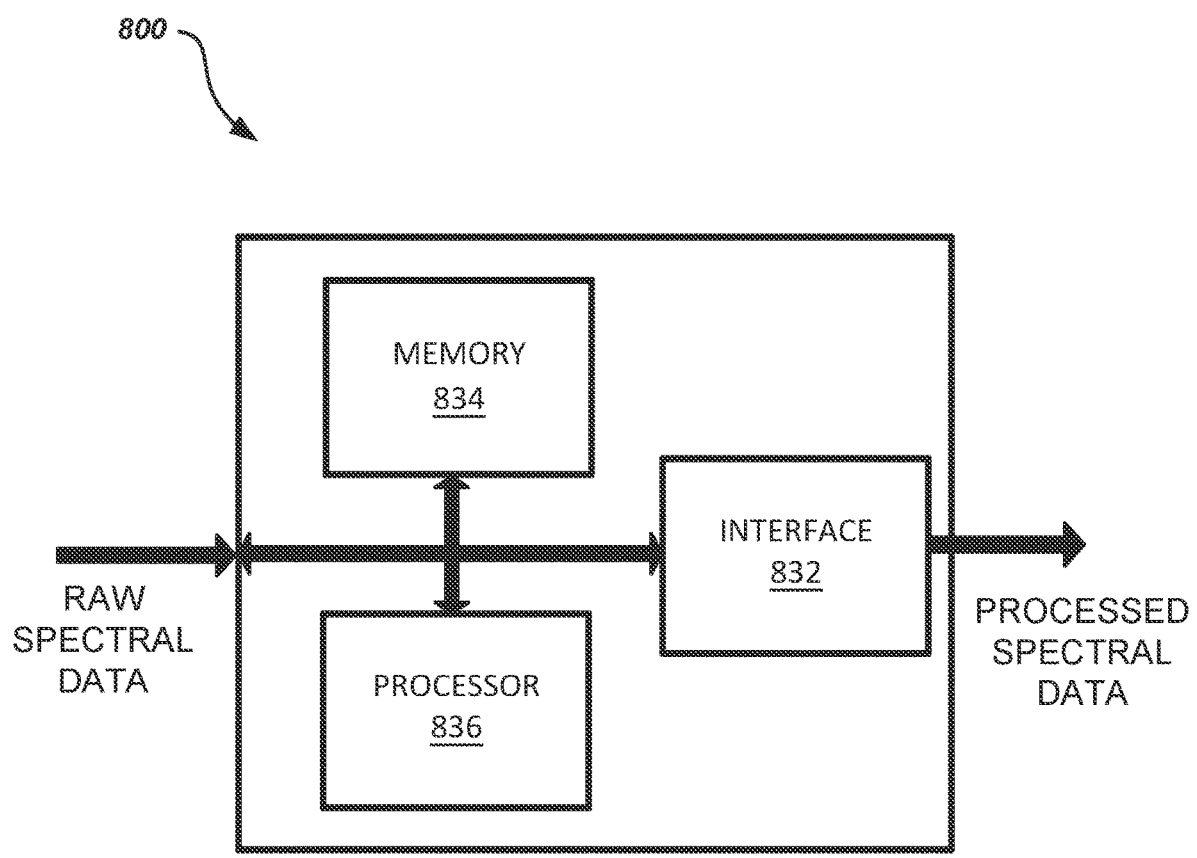
FIG. 8 illustrates a block diagram of an example of a computing system configured to apply background correction and calibration to spectral data according to the principles of the disclosure.

FIG. 8 illustrates a computing system 800 that can be used for processes disclosed herein, such as identifying signals in spectral data and processing the signals. The computing device 800 can be a spectrometer or a portion of a spectrometer, such as spectrometer 160 or 710 disclosed herein. The computing device 800 may include at least one interface 832, a memory 834 and a processor 836. The interface 832 includes the necessary hardware, software, or combination thereof to receive, for example, raw spectral data and to transmit, for example, processed spectral data.

A portion of the interface 832 can also include the necessary hardware, software, or combination thereof for communicating analog or digital electrical signals. The interface 832 can be a conventional interface that communicates via various communication systems, connections, busses, etc., according to protocols, such as standard protocols or proprietary protocols (e.g., interface 832 may support I2C, USB, RS232, SPI, or MODBUS).

The memory 834 is configured to store the various software and digital data aspects related to the computing device 800. Additionally, the memory 834 is configured to store a series of operating instructions corresponding to an algorithm or algorithms that direct the operation of the processor 836 when initiated to, for example, identify anomalous signals in spectral data and process identified anomalous signals. The process 600 and variations thereof being representative examples of algorithms. The processing may include removing or modifying the signal data or a different action. For example, the processor 836 can identify and characterize a background signal or signals derived from non-optical signals and apply background correction and calibration to the background signal. The memory 834 can be a non-transitory computer readable medium (e.g., flash memory and/or other media). The processor 836 is configured to direct the operation of the computing device 800. As such, the processor 836 includes the necessary logic to communicate with the interface 832 and the memory 834 and perform the functions described herein to identify and process anomalous signals in spectral data.

A portion of the above-described apparatus, systems or methods may be embodied in or performed by various, such as conventional, digital data processors or computers, wherein the computers are programmed or store executable programs of sequences of software instructions to perform one or more of the steps of the methods. The software instructions of such programs or code may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems or apparatuses described herein.

Portions of disclosed embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter. Configured means, for example, designed, constructed, or programmed, with the necessary logic, algorithms, processing instructions, and/or features for performing a task or tasks.

The changes described above, and others, may be made in the optical measurement systems and subsystems described herein without departing from the scope hereof. For example, although certain examples are described in association with semiconductor wafer processing equipment, it may be understood that the optical measurement systems described herein may be adapted to other types of processing equipment such as roll-to-roll thin film processing, solar cell fabrication or any application where high precision optical measurement may be required. Furthermore, although certain embodiments discussed herein describe the use of a common light analyzing device, such as an imaging spectrograph, it should be understood that multiple light analyzing devices with known relative sensitivity may be utilized. Furthermore, although the term "wafer" has been used herein when describing aspects of the current invention, it should be understood that other types of workpieces such as quartz plates, phase shift masks, LED substrates and other non-semiconductor processing related substrates and workpieces including solid, gaseous and liquid workpieces may be used.

The examples described herein were selected and described in order to best explain the principles of the disclosure and practical applications, and to enable others of ordinary skill in the art to understand the disclosure for various applications with various modifications as are suited to the particular use contemplated. The particular examples described herein are in no way intended to limit the scope of the features disclosed herein as it may be practiced in a variety of variations and environments without departing from the scope and intent of the disclosure. Thus, the present disclosure is not intended to be limited to the illustrated examples, but is to be accorded the widest scope consistent with the principles and features described herein.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one of skill in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects all generally referred to herein as a "circuit" or "module." Furthermore, the present disclosure may take the form of a computer program product on a computer-usable storage medium having computer-usable program code embodied in the medium.

Various aspects of the disclosure can be claimed including the apparatuses, systems, and methods disclosed herein. Aspects disclosed herein and noted in the Summary include:

A. An optical measurement system comprising: (1) a pixel area of an optical sensor having multiple pixels that store an electrical charge corresponding to a received optical signal, (2) one or more reduced illumination regions that provide signal levels intrinsic to the optical sensor, and (3) one or more processors configured to adjust, during active operation of the system, digital representations of the electrical charges from the pixels of the pixel area using characterizations of the signal levels from the one or more reduced illumination regions.

B. A method of processing optical data comprising: (1) defining a dark level estimate value for an optical sensor that receives the optical data, (2) collecting active pixel values from active pixels of the optical sensor, (3) generating dark subtracted pixel values from the active pixel values and the dark level estimate values, and (4) generating corrected active pixel values by modifying the active pixel values based on the dark subtracted pixel values.

C. A computer program product having a series of operating instructions stored on a non-transitory computer readable medium that directs one or more processors, when initiated thereby, to perform operations for adjusting digital representations of electrical charges from pixels of a pixel area of an optical sensor, the operations comprising: (1) characterizing signal levels from pixels of the optical sensor, wherein the pixels include pixels from one or more reduced illumination regions of the optical sensor and (2) adjusting digital representations of the electrical charges using the characterizations.

Each of aspects A, B, and C can have one or more of the following additional elements in combination: Element 1: wherein the one or more reduced illumination regions include blank pixels, bevel pixels, or a combination of both. Element 2: wherein the one or more reduced illumination regions include pixels of the pixel area that are unilluminated by the received optical signal. Element 3: wherein each of the characterizations correspond to one of multiple different types of variations of the signal levels. Element 4: wherein the multiple different types of the variations correspond to non-optical signals. Element 5: wherein the multiple different types of the variations include at least one of signal offsets or signal transients. Element 6: wherein the multiple different types of the variations include signal variations driven by temperature, sampling frequency, or other non-optical factors. Element 7: wherein the multiple different types of the variations include thermal saturation. Element 8: wherein the one or more processors are further configured to adjust the digital representations of the electrical charges from the pixels of the pixel area according to at least one variation associated with one or more of the pixels. Element 9: wherein the optical measurement system includes a spectrometer. Element 10: wherein at least one of the one or more processors are integrated with the spectrometer. Element 11: wherein at least one of the one or more processors is external to the spectrometer. Element 12: wherein the one or more processors are further configured to provide the characterizations. Element 13: wherein generating the corrected active pixel values includes providing intensity corrected values of the active pixel values based on the dark subtracted pixel values. Element 14: further comprising applying a broadband calibration vector for processing the spectral data, wherein the intensity corrected values are a combination of values from the broadband calibration vector and the dark subtracted pixel values. Element 15: further comprising detecting saturated pixels within the active pixels using a saturation threshold, generating a saturation mask based on the saturated pixels, and generating adjusted active pixel values by applying the saturation mask to the corrected active pixel values. Element 16: further comprising providing the adjusted active pixel values as a uniform wavelength-space representation using interpolation. Element 17: wherein generating the corrected active pixel values further includes modifying the active pixel values by applying a uniform gain value. Element 18: wherein generating the corrected active pixel values further includes providing an engineered dark level value to the corrected active pixel values. Element 19: wherein the characterizing includes defining a dark level estimate value for the optical sensor. Element 20: wherein the dark level estimate value is based on a running average of the signal levels from pixels of the one or more reduced illumination regions. Element 21: wherein the dark level estimate value is based on a mathematical representation of the signal levels from pixels of the one or more reduced illumination regions. Element 22: wherein the characterizing includes using engineered dark level values.

What is claimed is:

1. An optical measurement system, comprising:
   a pixel area of an optical sensor having multiple pixels that store an electrical charge corresponding to a received optical signal;
   one or more reduced illumination regions that provide signal levels intrinsic to the optical sensor; and
   one or more processors configured to detect saturated pixels of the pixels of the pixel area using a saturation threshold, generate a saturation mask based on the saturated pixels, and adjust, during active operation of the system, digital representations of the electrical charges from the pixels of the pixel area using the saturation mask and characterizations of the signal levels from the one or more reduced illumination regions.

2. The optical measurement system as recited in claim 1, wherein the one or more reduced illumination regions include blank pixels, bevel pixels, or a combination of both.

3. The optical measurement system as recited in claim 1, wherein the one or more reduced illumination regions include pixels of the pixel area that are unilluminated by the received optical signal.

4. The optical measurement system as recited in claim 1, wherein each of the characterizations correspond to one of multiple different types of variations of the signal levels.

5. The optical measurement system as recited in claim 4, wherein the multiple different types of the variations correspond to non-optical signals.

6. The optical measurement system as recited in claim 4, wherein the multiple different types of the variations include at least one of signal offsets or signal transients.

7. The optical measurement system as recited in claim 4, wherein the multiple different types of the variations include signal variations driven by temperature, sampling frequency, or other non-optical factors.

8. The optical measurement system as recited in claim 4, wherein the multiple different types of the variations include thermal saturation.

9. The optical measurement system as recited in claim 1, wherein the one or more processors are further configured to adjust the digital representations of the electrical charges from the pixels of the pixel area according to at least one variation associated with one or more of the pixels.

10. The optical measurement system as recited in claim 1, wherein the optical measurement system includes a spectrometer.

11. The optical measurement system as recited in claim 10, wherein at least one of the one or more processors are integrated with the spectrometer.

12. The optical measurement system as recited in claim 10, wherein at least one of the one or more processors is external to the spectrometer.

13. The optical measurement system as recited in claim 1, wherein the one or more processors are further configured to provide the characterizations.

14. A method of processing optical data, comprising:
defining a dark level estimate value for an optical sensor that receives the optical data;
collecting active pixel values from active pixels of the optical sensor;
generating dark subtracted pixel values from the active pixel values and the dark level estimate values;
generating corrected active pixel values by modifying the active pixel values based on the dark subtracted pixel values
detecting saturated pixels within the active pixels using a saturation threshold,
generating a saturation mask based on the saturated pixels, and
generating adjusted active pixel values by applying the saturation mask to the corrected active pixel values.

15. The method of processing optical data as recited in claim 14, wherein generating the corrected active pixel values includes providing intensity corrected values of the active pixel values based on the dark subtracted pixel values.

16. The method as recited in claim 15, further comprising applying a broadband calibration vector for processing the optical data, wherein the intensity corrected values are a combination of values from the broadband calibration vector and the dark subtracted pixel values.

17. The method as recited in claim 14, wherein the saturation mask is represented by a binary array.

18. The method as recited in claim 14, further comprising providing the adjusted active pixel values as a uniform wavelength-space representation using interpolation.

19. The method as recited in claim 14, wherein generating the corrected active pixel values further includes modifying the active pixel values by applying a uniform gain value.

20. The method as recited in claim 14, wherein generating the corrected active pixel values further includes providing an engineered dark level value to the corrected active pixel values.

21. A computer program product having a series of operating instructions stored on a non-transitory computer readable medium that directs one or more processors, when initiated thereby, to perform operations for adjusting digital representations of electrical charges from pixels of a pixel area of an optical sensor, the operations comprising:
characterizing signal levels from pixels of the optical sensor, wherein the pixels include pixels from one or more reduced illumination regions of the optical sensor;
detecting saturated pixels of the pixels of the pixel area using a saturation threshold;
generating a saturation mask based on the saturated pixels; and
adjusting digital representations of the electrical charges using the saturation mask and the characterizations.

22. The computer program product as recited in claim 21, wherein the characterizing includes defining a dark level estimate value for the optical sensor.

23. The computer program product as recited in claim 22, wherein the dark level estimate value is based on a running average of the signal levels from pixels of the one or more reduced illumination regions.

24. The computer program product as recited in claim 22, wherein the dark level estimate value is based on a mathematical representation of the signal levels from pixels of the one or more reduced illumination regions.

25. The computer program product as recited in claim 22, wherein the characterizing includes using engineered dark level values.

* * * * *